United States Patent
Verroeye

(10) Patent No.: US 7,694,800 B2
(45) Date of Patent: Apr. 13, 2010

(54) METHOD AND DEVICE FOR HANDLING PROFILE PARTS

(76) Inventor: Thierry Verroeye, Den Duiver 35, De Pinte (BE) 9840

( * ) Notice: Subject to any disclaimer, the term of this patent is extended or adjusted under 35 U.S.C. 154(b) by 603 days.

(21) Appl. No.: 11/555,835

(22) Filed: Nov. 2, 2006

(65) Prior Publication Data
US 2007/0106415 A1    May 10, 2007

(30) Foreign Application Priority Data

Nov. 4, 2005   (EP)   ................... 05110368
Nov. 7, 2005   (EP)   ................... 05110411

(51) Int. Cl.
*B65G 47/90* (2006.01)
(52) U.S. Cl. ................ 198/401; 414/774; 83/401
(58) Field of Classification Search ............. 83/401, 83/284, 37, 732; 148/196, 200; 198/422, 198/401, 502.2, 502.3; 414/774, 776, 781; 209/517–519, 538, 540–542, 545
See application file for complete search history.

(56) References Cited

U.S. PATENT DOCUMENTS

| | | | | |
|---|---|---|---|---|
| 3,880,296 A | * | 4/1975 | Kaplan | ................ 414/790 |
| 5,027,700 A | * | 7/1991 | Tschesche | ............... 414/788.3 |
| 5,434,428 A | * | 7/1995 | Paladini | ................. 250/559.24 |
| 5,733,101 A | * | 3/1998 | van der Hijden | ......... 414/792.9 |
| 6,360,142 B1 | * | 3/2002 | Miura et al. | ................ 198/395 |
| 2001/0046436 A1 | | 11/2001 | Mahoney | |
| 2005/0163581 A1 | * | 7/2005 | Schnoor et al. | ............... 410/77 |

FOREIGN PATENT DOCUMENTS

| | | |
|---|---|---|
| DE | 11 48 485 | 5/1963 |
| DE | 27 31 579 | 1/1979 |
| GB | 1 412 304 | 11/1975 |

* cited by examiner

*Primary Examiner*—Stephen Choi
(74) *Attorney, Agent, or Firm*—Sughrue Mion, PLLC

(57) ABSTRACT

A device for handling profile parts, including a mechanism for linearly and/or axially positioning such parts perpendicularly to the longitudinal direction of the profiles, for conveying, for measuring, for controlling the cutting and/or for stacking such parts, with at least one supporting beam placed parallel to the longitudinal direction of the profiles wherein the beam is provided with a mechanism for picking up the parts, and wherein the device includes a mechanism for axially rotating the beam and a mechanism for linearly moving the beam in two or more directions perpendicular to its longitudinal direction.

12 Claims, 2 Drawing Sheets

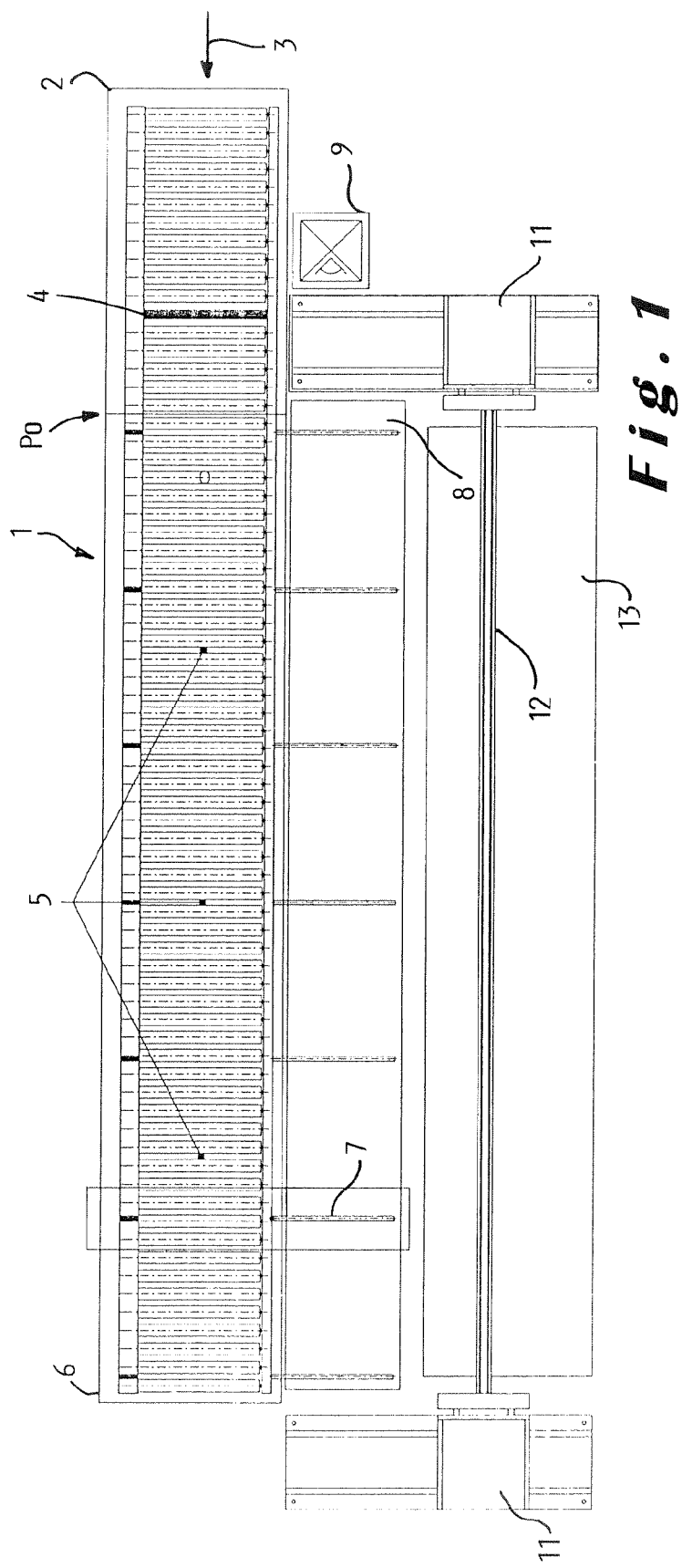
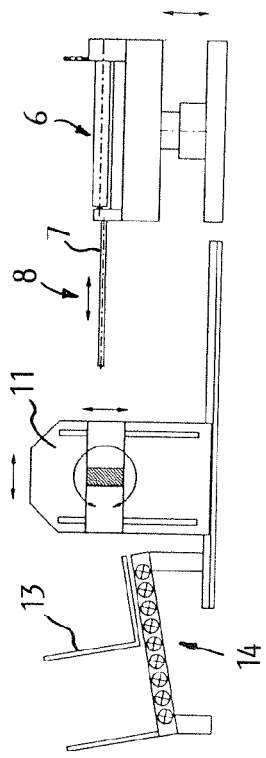
Fig. 1
Fig. 2

METHOD AND DEVICE FOR HANDLING PROFILE PARTS

BACKGROUND OF THE INVENTION

The invention relates to a method and a device for handling profile parts. Metal and plastic profiles are in general produced in continuous rolling and/or extrusion processes; the obtained continuous profiles are then cut into profile parts, which have to be properly collected, stacked and bundled. Nowadays the stacking, bundling and packing of such profiles has often still to be carried out manually, certainly when complex shapes are involved, or when the profile of rather great lengths are involved, or when the profiles have to be stacked according to defined patterns for optimal packaging. Attempts to automate such processes have not been very successful up till now, whereby the main obstacle has shown to be the adaptability of the methods to the variable shapes, lengths, etc. of the profile parts.

Methods and devices for linearly and/or axially positioning longitudinal articles perpendicularly to the longitudinal direction of the articles, for conveying and/or for stacking said articles, are known from the state of the art, in particular methods and devices involving a supporting beam placed parallel to the longitudinal direction of the articles, provided with means for picking up said parts, and means for axially rotating said beam and means for linearly moving said beam in two or more directions perpendicular to its longitudinal direction.

Thus U.S. Pat. No. 5,733,101 discloses an apparatus for stacking and unstacking articles, involving a swivellable supporting beam comprising means for picking up the articles, and involving means for axially rotating said beam and means for linearly moving said beam in two or more directions.

UK patent 1 412 304 discloses a stacking device for steel profiles, comprising means for adjusting the vertical position of a support beam and means for pivoting magnets supported below said supporting beam through an arc of 90.

It is now the objective of the present invention to provide a flexible and versatile method and device for handling profile parts, which is capable of properly positioning such profile parts, according to axial and linear movements perpendicular to the longitudinal direction of the profiles, and more particularly to provide an automated process able to handle (stack and bundle) the profiles according to a programmed pattern.

SUMMARY OF THE INVENTION

To achieve this objective the invention provides a device for handling profile parts, comprising means for linearly and/or axially positioning such parts perpendicularly to the longitudinal direction of the profiles, for conveying such parts, and/or for stacking such parts, with at least one supporting beam placed parallel to the longitudinal direction of the profiles whereas said beam is provided with means for picking up said parts, and with means for axially rotating said beam and means for linearly moving said beam in two or more directions perpendicular to its longitudinal direction, which device comprises computer controlled optical means to detect the transverse sectional shape and position of the profile, cooperating with said means for axially rotating and linearly moving said beam.

The use of a supporting beam provides for a proper support of the profile parts, with multiple picking up/support/bearing positions along the length of the profile, and allows for increased accuracy in the handling.

Depending on the material of the profile parts (Ferro material or non Ferro material, such as in particular Aluminium) the picking up means can consist of magnetic means, vacuum means or any other technique well known per se in the art.

The use of computer controlled optical detection means ("image scanning"), in accordance with the invention, provides for increased accuracy in the handling (support position, pick up approach) of the profiles and can involve quality control of the rolling operation (checking the profile shape).

The method and device thus involves suitable software (which is in itself easily designable by a skilled person) to program the handling and positioning of the parts in function of their shape and the user requirement (stacking and bundling pattern).

In a preferred embodiment of the invention the device for handling profile parts comprising means for conveying and for stacking such parts comprises more in particular computer controlled optical means for measuring the length of profile parts fed into the device, which computer controlled optical means may optionally cooperate with the computer controlled means for detecting the shape and position of the profile.

The use of computer controlled optical measuring means, in accordance with the invention, provides for in-line/on-line measurement of the length of the profiles.

The invention thus also provides a device for handling profile parts comprising means for conveying, for measuring, for controlling the cutting and for stacking such parts, with at least one supporting beam placed parallel to the longitudinal direction of the profiles whereas said beam is provided with means for picking up said parts, means for axially rotating said beam and means for linearly moving said beam in two or more directions perpendicular to its longitudinal direction, computer controlled optical means to detect the transverse sectional shape and position of the profile, cooperating with said means for axially rotating and linearly moving said beam, so as to allow proper pick up and controlled stacking of the profile parts, and computer controlled optical means for measuring the length of profiles/profile parts fed into the device, which optionally cooperate with the computer controlled means for detecting shape and position of the profile.

In a preferred embodiment of the invention the device for handling profile parts comprising means for conveying, for measuring and for stacking such parts (with optional means for controlling the cutting thereof), comprises more in particular a plurality of fixed measurement cells along the feed path of the profiles/profile parts into the device, cooperating with computer controlled optical means for measuring the length of profile parts to increase accuracy of the length measurement.

The use of a plurality of fixed measurement cells, in accordance with the invention, provides for an improved dimensional accuracy (product tolerance) of the profile parts.

According to a further preferred feature of the invention the devices involving means for conveying and stacking profile parts may also suitably comprise means for controlling the cutting of the profiles fed to the device cooperating with computer controlled means for measuring the length of the profile parts.

The at least one supporting beam of the devices referred to above, may, depending on the application, have a length of more than 6 meters.

According to still another preferred feature of the invention, the means of the devices according to the invention, for axially rotating said beam and said means for linearly moving said beam in two or more directions perpendicular to its longitudinal direction, may suitably involve individually operated motor means provided on supporting frames at one or both ends of said beam, whereby the synchronised operation of said motor means is controlled by computer means.

According to yet another preferred feature of the invention, a plurality of means for picking up the profile parts, are provided to the said supporting beam, at intervals of the beam determined in function of the length of the beam and the nature of the parts to be handled.

The invention also provides a new method for handling profile parts, in which profile parts are positioned linearly and/or axially, perpendicular to the longitudinal direction of the profiles, and/or conveyed and/or stacked, using a beam supporting said profile parts parallel to their longitudinal direction and by axially rotating said supporting beam and linearly moving said supporting beam in two or more directions, perpendicular to its longitudinal direction, which method involves computer controlled optical means to detect the transverse sectional shape and position of the profile, and by using computer controlled axial rotation and linear moving of said supporting beam, so as to allow proper pick up and controlled stacking of the profile parts.

According to a further feature of the method according to the invention, the length of the profile parts is measured using computer controlled optical means so as to cut the profiles to appropriate size.

Preferably, fixed measurement cells may be used along the path of the profiles/profile parts, which cooperate with the computer controlled optical means to increase the measurement and cutting accuracy.

In a preferred embodiment of the invention, computer controlled individually operated motor means may be used for the axial rotation and for each linear movement of said supporting beam handling the profile parts.

BRIEF DESCRIPTION OF THE DRAWINGS

Further details and features of the invention will appear from the following description of a preferred embodiment of the device and method according to the invention, given by way of non-limiting example having reference to the attached drawings, in which FIG. 1 is a schematic top view of an installation or device according to the invention for handling profiles coming out of a profile production equipment FIG. 2 is a schematic view of the installation or device of FIG. 1, seen from the direction of arrowhead 3 of FIG. 1

DETAILED DESCRIPTION OF THE INVENTION

Figure 3:
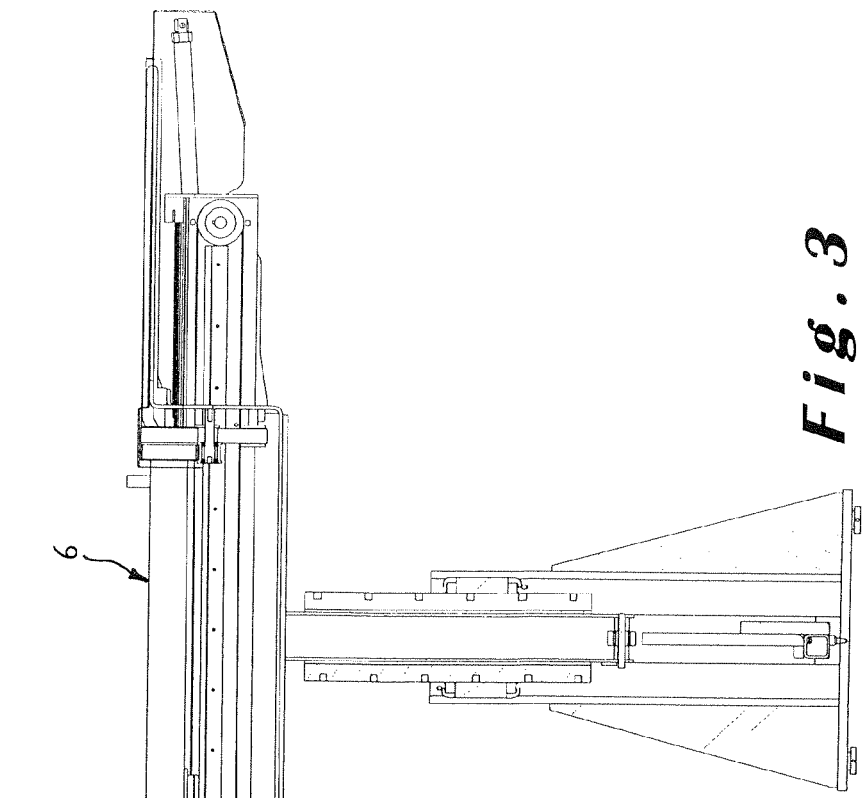
FIG. 3 is a more detailed view of the means for conveying the profile parts shown in FIG. 2
Figure 4:
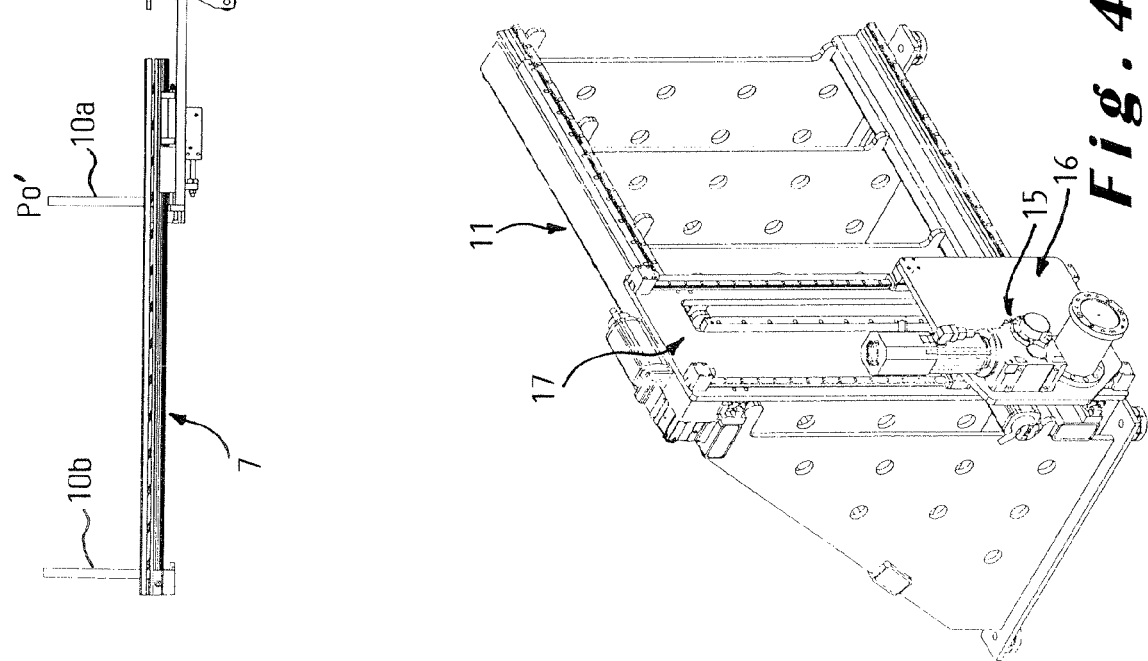
FIG. 4 is a perspective front view of one specific embodiment of the invention for the means for axially rotating and linearly moving the supporting beam for handling profile parts

The installation for handling profiles, shown in FIGS. 1 and 2, designated as a whole with reference numeral 1, comprises a conveyor (such as a roll conveyor belt) -2-, with adjustable height perfectly adapting to a profile rolling line (not represented, but indicated by an arrow -3- indicating the rolling direction of the profiles) positioned just in front of the installation -1-. The initial part of conveyor belt -2- provides for accelerated transport of the profiles. This acceleration of the products is necessary to build up processing time required between the handling of two successive products. Optionally this conveyor 2 may be provided to be able to turn over to collect small profile parts in, for instance, a bulk container.

This same initial part of the conveyor -2- is equipped with an optical measuring means, schematically shown as area -4- in FIG. 1.

According to the invention the accuracy of such a computer controlled dynamic measuring means -4- may be increased by positioning optical cells -5- at accurately defined distances further along the path of the profiles/profile parts (on a second conveyor -6-), so as to provide an in-line correction of any incremental measuring errors of the dynamic measuring means.

The profile part rolls onto this second conveyor -6- and is stopped at a predetermined position (point zero) -$p_0$-.

A set of pushing arms -7- move the profile part laterally and keep it retained in area -8- alongside conveyor -6-, while digital imaging of the position and the transverse sectional shape of the profile takes place by means of an optical scanner -9- translating the image into an X-Y axis system (with, more in particular, an $\alpha$-$\omega$ rotation option).

The retention of the profiles is achieved via the pushing arms -7- provided at regular distances along the conveyor -6- and comprising upwardly extendable squeezing fingers -10- which, in lower (retracted/turned down) position, can pass under a next profile that is being produced (rolled), and which, in upper position, can push the profile part sideway and help to squeeze it at a point zero position -$p_0$- (finger 10$a$), assisted in this operation by an auxiliary finger -10$b$-. The fingers 10$a$, 10$b$ follow the movement of the main arms -7- and are provided so that the distance between the fingers 10$a$ and 10$b$ automatically adapt to the product width, so as to support and squeeze the profile part.

Two mechanical wagon systems -11-, connected to each other through a support beam -12-, are steered by the computer in function of the scanned image.

The support beam -12- comprises several adjustable pick up means (not represented, consisting of any magnetic, vacuum or other pick up means well known per se in the art) for squeezing/picking up the profile parts, specifically designed in function of the profile shape to be handled. The pick up means seize the profile part in area -8-, after which the arms -7- immediately retract so as to allow the support beam ("handling bridge" for the profile parts) to carry out a complete circle.

Thus also the pick up points can reach the total 360° (with the pushing arm 7 and squeezing fingers retracted/turned down)

The profile part -13- can then be stacked according to a pre-programmed pattern in area -14-.

The mechanical wagon system -11-, illustrated more in detail in FIG. 3, involves means -15- for axially rotating the support beam perpendicular to its longitudinal direction, and means -16- for linearly moving the support beam in a X-direction perpendicular to its longitudinal direction, and means -17- for linearly moving the support beam in a Y-direction perpendicular to its longitudinal direction, as generally known per se in the art in mechanical wagon systems for moving objects in all directions.

It should be observed that many variations to the specifically disclosed embodiments of the invention will be readily conceivable by the average person skilled in the art of machinery design or profile handling, without departing from the general disclosure of the invention as set out here above and as defined in the claims at the end of the disclosure.

The invention claimed is:

1. Device for handling profile parts comprising means for linearly and/or axially positioning said parts perpendicularly to the longitudinal direction of the profiles, and/or for conveying said parts and/or for stacking said parts, said means comprising
   at least one supporting beam placed parallel to the longitudinal direction of the profiles, provided with means for picking up said parts, and
   means for axially rotating said beam and means for linearly moving said beam in two or more directions perpendicular to its longitudinal direction,
wherein said device further comprises computer controlled optical means to detect the transverse sectional shape and position of the profile, cooperating with said means for axially rotating and linearly moving said beam, so as to allow proper pick up and controlled stacking of the profile parts.

2. Device according to claim 1, further comprising computer controlled optical means for measuring the length of profiles/profile parts fed into the device, and for optionally cooperating with the computer controlled means for detecting the shape and position of the profile.

3. Device according to claim 2, wherein said optical means for measuring the length of profiles/profile parts fed into the device comprise means for controlling cutting of said parts.

4. Device according to claim 2, which further comprises a plurality of fixed measurement cells along a feed path of the profiles/profile parts into the device, cooperating with computer controlled optical means for measuring the length of profile parts to increase accuracy of the length measurement.

5. Device according to claim 2, which further comprises means for cutting profiles fed into the device, cooperating with said computer controlled means for measuring the length of the profile parts.

6. Device according to claim 1, wherein said means for axially rotating said beam and said means for linearly moving said beam in two or more directions perpendicular to its longitudinal direction involve individually operated motor means provided on supporting frames at one or both ends of said beam, whereby the synchronised operation of said motor means is controlled by computer means.

7. Device according to claim 1, wherein said beam is provided with a plurality of means for picking up said parts, at intervals of the beam determined in function of the length of the beam and the nature of the parts to be handled.

8. Method for handling profile parts in which profile parts are positioned linearly and/or axially, perpendicular to the longitudinal direction of the profiles, using a beam supporting said profile parts parallel to their longitudinal direction and positioned by axially rotating the supporting beam and linearly moving the supporting beam in two or more directions, perpendicular to its longitudinal direction, wherein said profile parts are conveyed and stacked by using computer controlled optical means to detect the transverse sectional shape and position of the profile, and computer controlled axial rotation and linear movement of said supporting beam, so as to allow proper pick up and controlled stacking of the profile parts.

9. Method according to claim 8, wherein the length of said profile parts is measured using said computer controlled optical means and cut to appropriate size.

10. Method according to claim 9, wherein fixed measurement cells along the path of the profiles/profile parts cooperates with the computer controlled optical means to increase the measurement and cutting accuracy.

11. Method according to claim 8, wherein computer controlled individually operated motor means are used for the axial rotation and for each linear movement of said supporting beam.

12. Device for handling profile parts, comprising
   means for linearly and/or axially positioning said parts perpendicularly to the longitudinal direction of the profiles, and/or for conveying said parts and/or for stacking said parts, said means comprising
   at least one supporting beam placed parallel to the longitudinal direction of the profiles, provided with means for picking up said parts, and with means for axially rotating and linearly moving said parts in two or more directions perpendicular to their longitudinal direction,
wherein said device further comprises computer controlled optical means to detect the transverse sectional shape and position of the profile, cooperating with said means for axially rotating and linearly moving said parts, so as to allow proper pick up and controlled stacking of the profile parts.

* * * * *